United States Patent [19]
Chow et al.

[11] Patent Number: 5,802,352
[45] Date of Patent: Sep. 1, 1998

[54] METHOD FOR SEPARATING DATA RETRIEVAL AND PRESENTATION IN AN OBJECT-ORIENTED REPORTING SYSTEM

[75] Inventors: Jenny Ming Chow; Susan Franklin Griffin; Martin Paul Nally, all of Raleigh; Lawrence Scott Rich, Apex, all of N.C.

[73] Assignee: International Business Machines Corp., Armonk, N.Y.

[21] Appl. No.: 619,948

[22] Filed: Mar. 18, 1996

[51] Int. Cl.$^6$ .................................................. G06F 17/30
[52] U.S. Cl. ...................... 395/500; 707/102; 707/103
[58] Field of Search ........................... 395/500, 611–617, 395/683; 707/100, 102, 103, 104, 200, 201

[56] References Cited

U.S. PATENT DOCUMENTS 5,263,167  11/1993  Conner, Jr. et al. .................... 395/304
5,664,182   9/1997  Nierenberg et al. ..................... 395/613

OTHER PUBLICATIONS

Wilde et al. "Maintenace Support for Object Oriented Programs, " IEEE, pp. 162–170. Oct. 1991.
Davis et al. "Object–Oriented Development At Brouklyn Uniion Gas, " IEEE, 67–74. Jan. 1993.
Kasper Osterbye "Literate Smalltalk Programming Using Hypertext, " IEEE, pp. 138–145. Feb. 1995.
Lejter et al. "Support For Maintenance Object–Oriented Programs, " IEEE, pp. 1045–1052. Dec. 1992.

Primary Examiner—Emanuel Todd Voeltz
Assistant Examiner—Vuthe Siek
Attorney, Agent, or Firm—A. Bruce Clay

[57] ABSTRACT

A report is generated in an object oriented software environment. A report iterator and a data iterator must have communications there between. The report iterator includes a report group header, a report group body having at least one report field, and a report group footer. Dependency is created between the contents of the report fields and an attribute of the current object. As a result of the communications established, a plurality of objects are stepped through sequentially. The dependency system is signalled each time the current object has changed. Each time the current object has changed, a new value is sent to a report field in the report group body.

13 Claims, 5 Drawing Sheets

FIG. 4

ALL ORGANIZATIONS 80

| DEPARTMENT NUMBER 82 | DEPARTMENT NAME 84 | MANAGER 86 | DIVISION 88 | LOCATION 90 |
|---|---|---|---|---|
| 10 — 96 (92) | HEAD OFFICE — 100 | 160 — 104 | CORPORATE — 108 | NEW YORK — 112 |
| 15 — 98 (94) | NEW ENGLAND — 102 | 50 — 106 | EASTERN — 110 | BOSTON — 113 |
| 20 | MID ATLANTIC | 10 | EASTERN | WASHINGTON |
| 38 | SOUTH ATLANTIC | 30 | EASTERN | ATLANTA |
| 42 | GREAT LAKES | 100 | MIDWEST | CHICAGO |
| 51 | PLAINS | 140 | MIDWEST | DALLAS |
| 66 | PACIFIC | 270 | WESTERN | SANFRANCISCO |
| 84 | MOUNTAIN | 290 | WESTERN | DENVER |
| NUMBER OF DEPARTMENTS: 116 | | | | 8 — 118 |

114

METHOD FOR SEPARATING DATA RETRIEVAL AND PRESENTATION IN AN OBJECT-ORIENTED REPORTING SYSTEM

FIELD OF THE INVENTION

The present invention relates to improvements in data processing systems, and more particularly, to a method and system for creating reports utilizing object oriented techniques.

BACKGROUND OF THE INVENTION

The use of object oriented languages for writing or developing software applications has been gaining popularity in recent years. Object oriented technology has several advantages over procedural language technology, including, among others, relative ease of use, ease of modification and superior potential for reusability of components from application to application. Object oriented software applications are typically developed by a software developer using an object oriented development environment. An object oriented development environment (such as VisualAge for Smalltalk from the IBM Corporation) typically includes the object oriented language, such as Smalltalk or C++, a variety of development tools, such as browsers, version and management capabilities, and debuggers, and a set of reusable object oriented classes, components, parts and/or frameworks which provide different functions such as a developer may desire for an application. Smalltalk language includes an underlying engine known as a virtual machine, which includes base functionality required to execute finished applications on a computer (and is typically packaged with applications), as well as a rich set of reusable object oriented classes, components, parts and frameworks. The developer basically pulls together instances of desired classes (objects) from the available classes, components, parts, and frameworks in order to create an application having desired function.

One aspect of object oriented languages is that the classes are typically interdependent and may possess a characteristic known as inheritance. Also, function is typically provided in that portion of an object known as a method. Thus, a method for one particular object may rely on a method of a different object or class to provide function. Objects interact with each other by sending messages asking other objects to carry out requests. The message is simply the name of a method that the receiver object knows how to execute. This type of interaction between objects helps a developer create elegant solutions. To date, no known system takes advantage of the object oriented environment to create reports. In fact, a traditional report generator is still the norm in object oriented development environments.

In a traditional report generator, there is a reporting engine very tightly integrated with the source of data to be reported upon, and the engine is designed specifically to iterate through this specific type of data using a known process. While iterating through the data, it is the engine's responsibility to update report fields with values for the current item. Thus, the engine must know something about the data, that is, how to proceed through all the individual items, and it must know something about each individual item, that is, how to get the required value into a form which can be displayed in a report field. This technique does not take advantage of the dynamic and flexible nature of an object oriented environment.

Thus, there is a need for a method and apparatus that takes advantage of the object oriented system characteristics for report generation.

SUMMARY OF THE INVENTION

The present invention disclosed herein comprises a method and system for report generation in an object oriented environment which eliminates problems associated with prior report engines. The present invention allows reports to be created while taking advantage of an object oriented environment.

In accordance with one aspect of the invention, a method and system for generating a report in an object oriented software environment is provided. A report iterator, including a report group header, a report group body with at least one report field, and a report group footer are first laid out. The report iterator invokes a known protocol to tell the data provider, referred to as a data iterator, that the next item of data is required. The data iterator is responsible for invoking an intermediate layer which will update the report fields with new values. The report iterator can then format the new row and continue iteration. This design allows report generation to be completely separated from object traversal and data retrieval. In addition, the dependency subsystem acts as this middle layer, allowing the data iterator and its contents to be ignorant of the details of report field updating.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 4 is a graphical representation of a report generated utilizing the present invention.

DETAILED DESCRIPTION OF THE INVENTION

Figure 1:
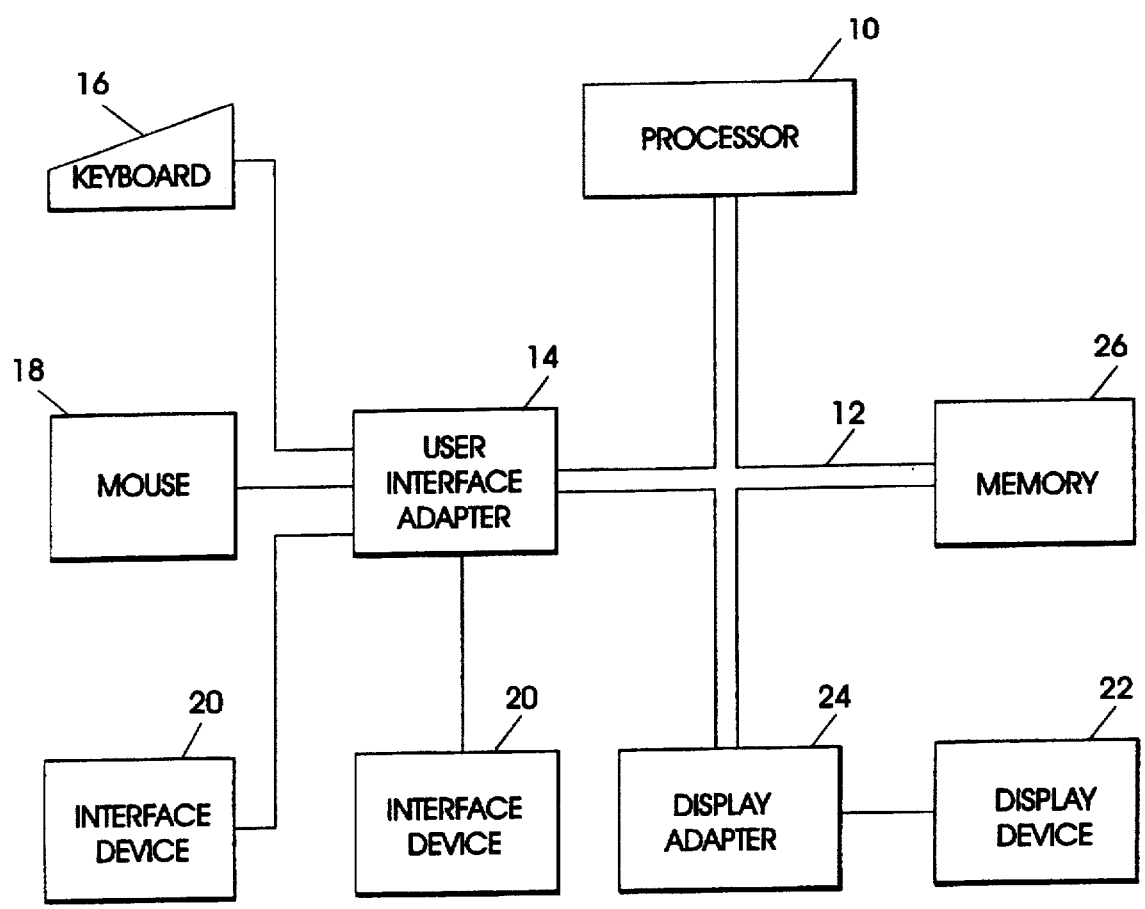
FIG. 1 is a block diagram of a representative hardware environment in which the present invention may be practiced.

The present invention may be performed in any of a variety of computer hardware environments and operating systems and/or software platforms utilizing an object oriented language. FIG. 1 illustrates a representative hardware environment in which the present invention may be practiced. The environment of FIG. 1 is representative of the conventional single user computer workstation, such as a personal computer, and related peripheral devices. The environment includes a microprocessor 10 and a bus 12 employed to connect and enable communication between the microprocessor 10 and the components of the workstation in accordance with known techniques. The workstation will typically include a user interface adapter 14, which connects the microprocessor 10 via the bus 12 to one or more interface devices, such as a keyboard 16, a mouse 18 and/or other user interface devices 20, which can be any user interface device, such as a touch sensitive screen, digitized pen entry pad, etc. The bus 12 also connects the display device 22, such as an LCD screen, CRT or a printer, to the microprocessor 10 via a display adapter 24. The bus 12 also connects the microprocessor 10 to memory 26, which can include ROM, RAM, etc.

Software programming code which employs the present invention is typically stored in the memory 26 of a standalone workstation, from which a developer may access the code. For distribution purposes, the software program code may be embodied on any of a variety of known media for use with a data processing system, such as a diskette or CD-ROM, or may be distributed to users from the memory of one computer system over a network of some type to other computer systems for use by users of such other systems. Such techniques and methods for embodying software code on media and/or distributing software code are well-known and will not be further discussed herein.

The present invention is described below in its preferred embodiment, in which the present invention is written in the Smalltalk language for operation in an OS/2 or Windows operating system environment. Smalltalk is an object oriented language, and supports the concept of reusable objects. In object oriented programming languages, such as Smalltalk and C++, objects are software entities comprising data structures (i.e., state information) and operations on the data (i.e., behavior). As such, objects are able to model real world entities in terms of characteristics (represented by data elements) and behavior (represented by data manipulation functions). Object oriented programming has inherently therein a number of characteristics which are not found in procedural languages, including encapsulation, polymorphism, and inheritance. Objects have incorporated therein the internal structure of their data and algorithms. Through polymorphism, a software component or object may make a request of another component or object without knowing exactly what that component or object is. The object or component which receives the request, interprets the request and determines, in accordance with its internal data functions how to execute the request. The concept of inheritance permits ease in modification of an object or a class. The developer can write a subclass which inherits behavior from all of its parent classes. The developer, by customizing the subclass, can effectively customize the entire hierarchy of classes to meet the developer's own needs. Thus, the bulk of the software may be reused without requiring extensive coding, recoding, or modifications.

All these properties of object oriented programming, as well as related object oriented programming techniques, are well known to those skilled in the art, and will not be discussed in depth herein. From the description provided herein, a skilled programmer could implement the invention. While the present invention will be described in terms of Smalltalk for use with VisualAge, the present invention may easily be embodied by a skilled programmer with other object oriented languages and programs.

In the reporting system described herein, a traditional report engine does not exist. The two main responsibilities of a traditional report engine (iterating through the report data and updating report fields) are distributed between report objects, a dependency mechanism, and the data objects themselves. In the present invention, dependency exists when one object requests that it be notified when an attribute of another object has changed. Connections are created in a visual programming environment to identify dependencies. When a connection is initialized at runtime, it specifies the details of the dependency, such as how the dependent object should be notified of a change. Once specified, these dependencies will perform the job of the traditional report engine, updating the report fields as data is iterated. Unlike a traditional report engine which must know where and how to get a value for each field and how to set the contents of the field, the present invention has much greater flexibility because the dependency mechanism is independent of any type of data object or report field. Only the data objects and fields are responsible for providing their own data and updates: their field contents. In n IBM VisualAge for Smalltalk environment, the specific steps for this connection are: 1) the user chooses a source object; 2) the user chooses a source object attribute; 3) the user chooses a target object; 4) the user chooses a target object attribute; and 5) the program draws a connecting line between the source object attribute and the target object attribute to indicate visually the connection and, hence, the dependency. Of course, the use of connections is just one example of how dependencies could be implemented, and could be replaced with any number of alternative subsystems. For example, code may be written that instructs an object to respond when a predetermined attribute has changed. The requirements herein are that an object be capable of signalling a change in an attribute that another object be able to register an interest in that attribute, and that the dependent object be able to specify how it should be notified of a change.

In order to function as desired, it is necessary that the object oriented environment have both a report iterator and a data iterator. Communication between the two iterators is established by connecting an "iterator" attribute of the report iterator to a "self" attribute of the data iterator. An iterator must have the following capabilities: 1) it must expose a "current" object on which dependencies can be set; 2) it must be capable of moving to the "next" object, updating the current object; 3) it must be capable of resetting itself to an initial state where a request for the next item will return the first item in its collection of objects; and 4) it must be capable of indicating when the current item is the last item. In a Smalltalk environment, the following protocol should be implemented by an iterator:

abtStepMessage should return a directed message, specifying a selector, a receiver, and any required arguments, which will cause the iterator to advance to the next object. The result of sending this message should be a boolean indicating whether or not the iteration was successful. Returning false indicates that the iteration failed and no output should be generated.

abtResetMessage should return a directed message, specifying a selector, a receiver, and any required arguments, which will cause the iterator to reset to its initial state such that sending the iterator its step message will make the current object the "FIRST" object in the collection of objects being iterated.

Iteration within a report group consists of sending the iterator its reset message when the report is initialized, then sending its step message until it returns false, and rendering each row while there is available data. A database query results table, as is known in the art, may serve as the data iterator.

A typical report may comprise any number of columns and lines, a header, a footer and drawings or charts. In order to facilitate understanding of the present invention, the disclosure herein will use a simple report format such as is shown in FIG. 4. Using the present invention and object oriented technology, a developer may design the layout of a report and specify what data from what object is to go where.

Figure 2:
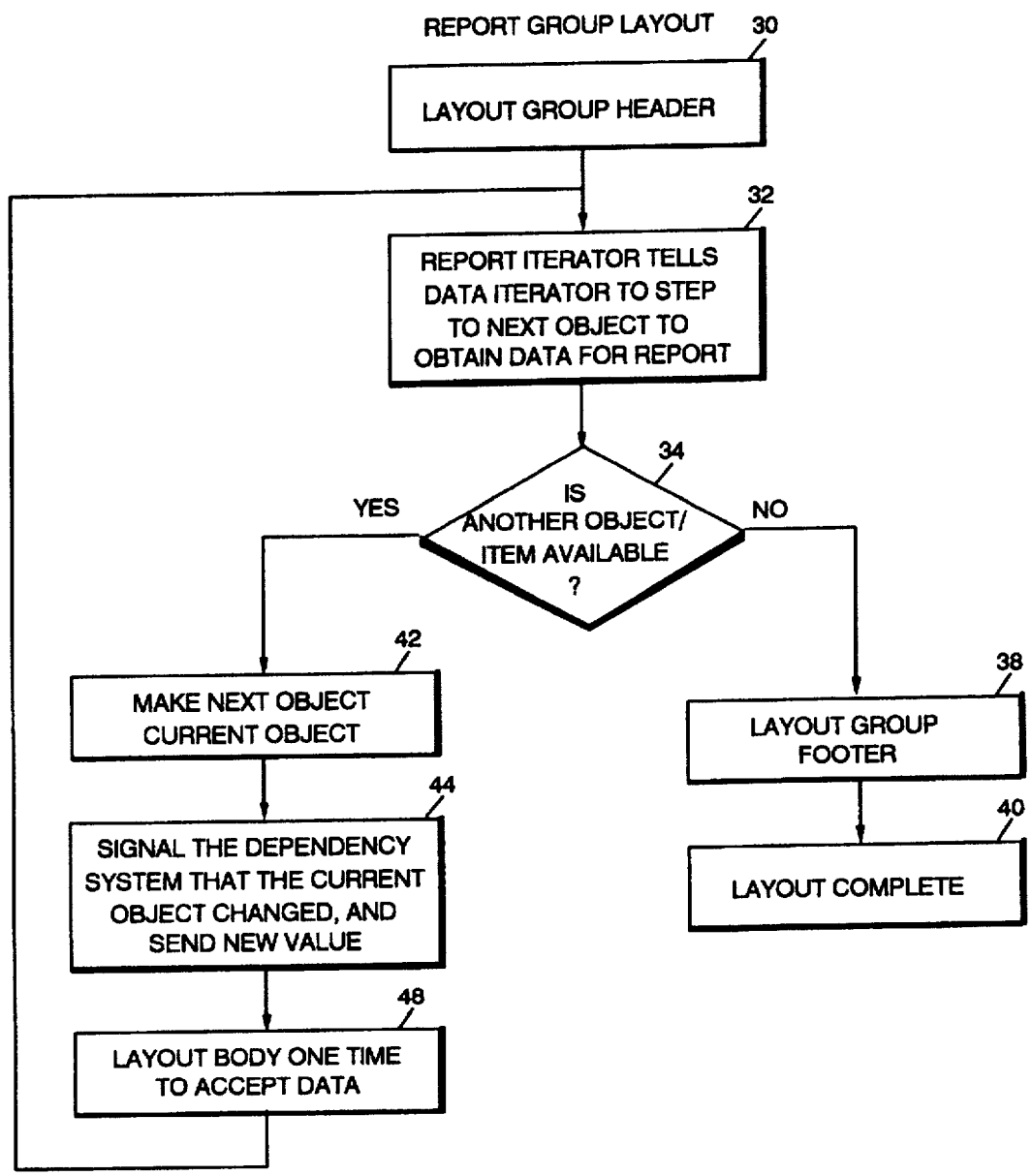
FIGS. 2 and 3 are flowcharts illustrating the logical steps involved with a report generated utilizing the present invention.

Referring first to FIG. 2, a high level flowchart illustrates a report group layout in accordance with the present invention. At block 30, a layout for a group header is created for the report. As shown in FIG. 4, the group header is generally identified by reference numeral 80 and includes a plurality of column headings including DEPARTMENT NUMBER (reference numeral 82), DEPARTMENT NAME (reference numeral 84), MANAGER (reference numeral 86), DIVISION (reference numeral 88), and LOCATION (reference numeral 90).

At block 32 of FIG. 2, a report iterator tells a data iterator to step to the next object to obtain data for the report. In the example shown in FIG. 4, there is an object (not shown) for each department listed. There is a department object which contains the necessary information found in, for example, line 92 or line 94. Included within the department objects is the information needed to produce the data found in each column in the header 80. For example, the column for DEPARTMENT NUMBER (reference numeral 82) contains the numerals 10 and 15, which are indicated by reference numerals 96 and 98, respectively; the column DEPARTMENT NAME (reference numeral 84) contains HEAD OFFICE (reference numeral 100) and NEW ENGLAND (reference numeral 102); the column MANAGER (reference numeral 86) contains the numerals 160 and 50 as indicated by the reference numerals 104 and 106, respectively; the column DIVISION (reference numeral 88) includes CORPORATE (reference numeral 108) and EASTERN (reference numeral 110); and the column LOCATION (reference numeral 90) includes NEW YORK (reference numeral 112) and BOSTON (reference numeral 113).

Subsequent to block 32, it is decided at decision block 34 whether or not another object/item is available. In other words, it is decided whether or not, referring to the example referred to in FIG. 4, whether there are additional department objects for the gathering of data. If the response to decision block 34 is "No", a group footer layout is created at block 38. Referring again to the example of FIG. 4, the group footer is indicated by reference numeral 114 and includes NUMBER OF DEPARTMENTS: and the numeral 8, indicated by reference numerals 116 and 118, respectively. The layout is then complete at block 40.

Referring again to decision block 34, if the response is "Yes", the next object, i.e., the next department, is made the current object at block 42. The dependency system is signalled at block 44 that the current object has changed and to send new values. The process followed in block 44 will be discussed in greater detail with reference to FIG. 3. At block 48, one body (i.e., a line of information such as lines 92 and 94 of FIG. 4) is laid out on the output device (i.e., a monitor or a printer). Subsequent to block 48, the present invention returns to block 32 as described above.

Figure 3:
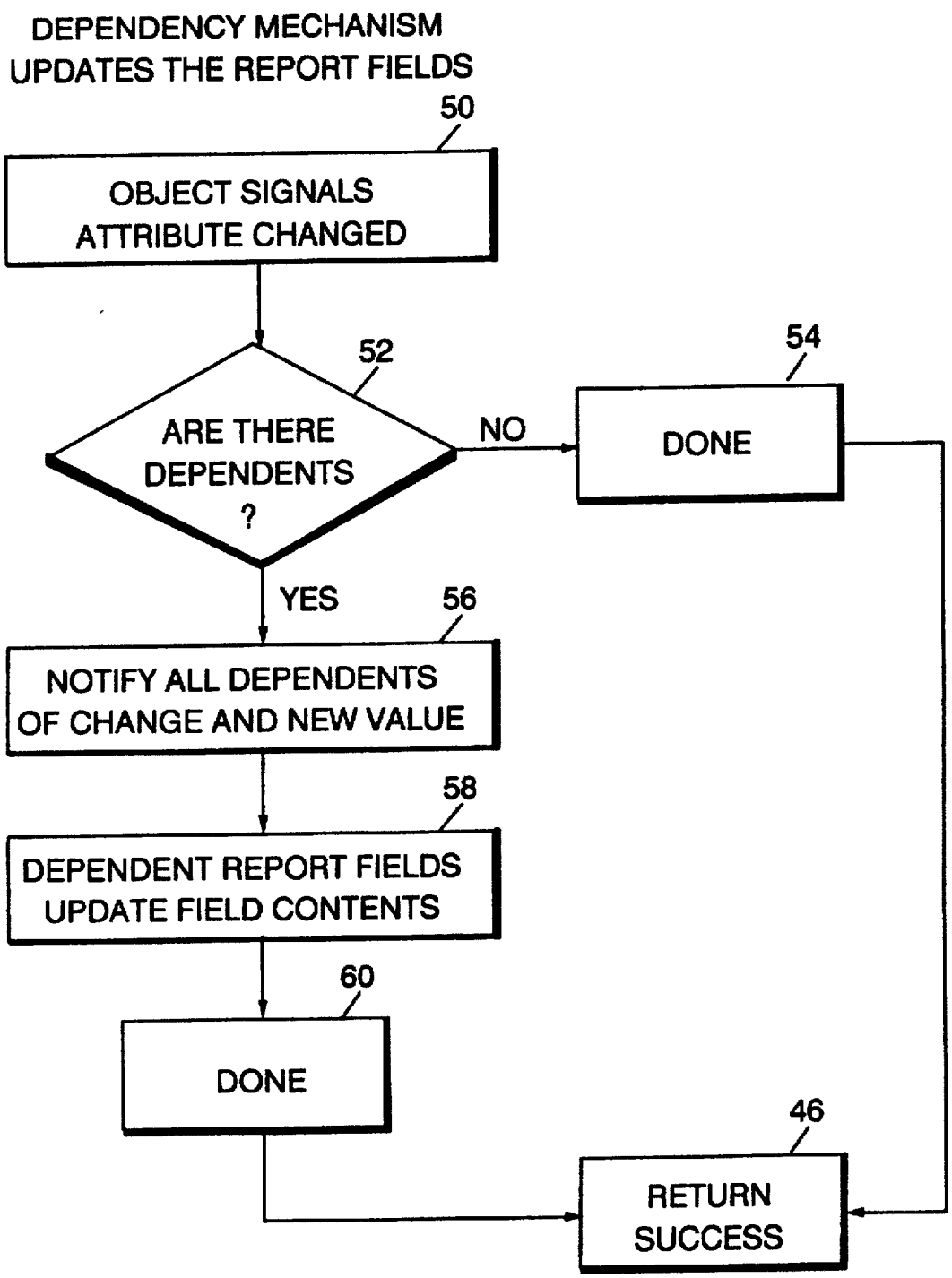

Referring to FIG. 3, the actions taken by the present invention at block 44 of FIG. 2 are described in greater detail. At block 50, the current object signals that an attribute has changed. At decision block 52 it is decided whether or not there are dependents, i.e., are these other objects that must update data based upon this object's attribute change. If the response to decision block 52 is "No", the current object is done at block 54 and the present invention returns success at block 46 and continues at block 48 of FIG. 2.

If the response to decision block 52 is "Yes", all dependents are notified of the change and the new value at block 56. At block 58, dependent report fields have their field contents updated. The current object is then done at block 60, followed by a return of success indication at block 46 and the present invention continues at block 48 of FIG. 2.

Figure 5:
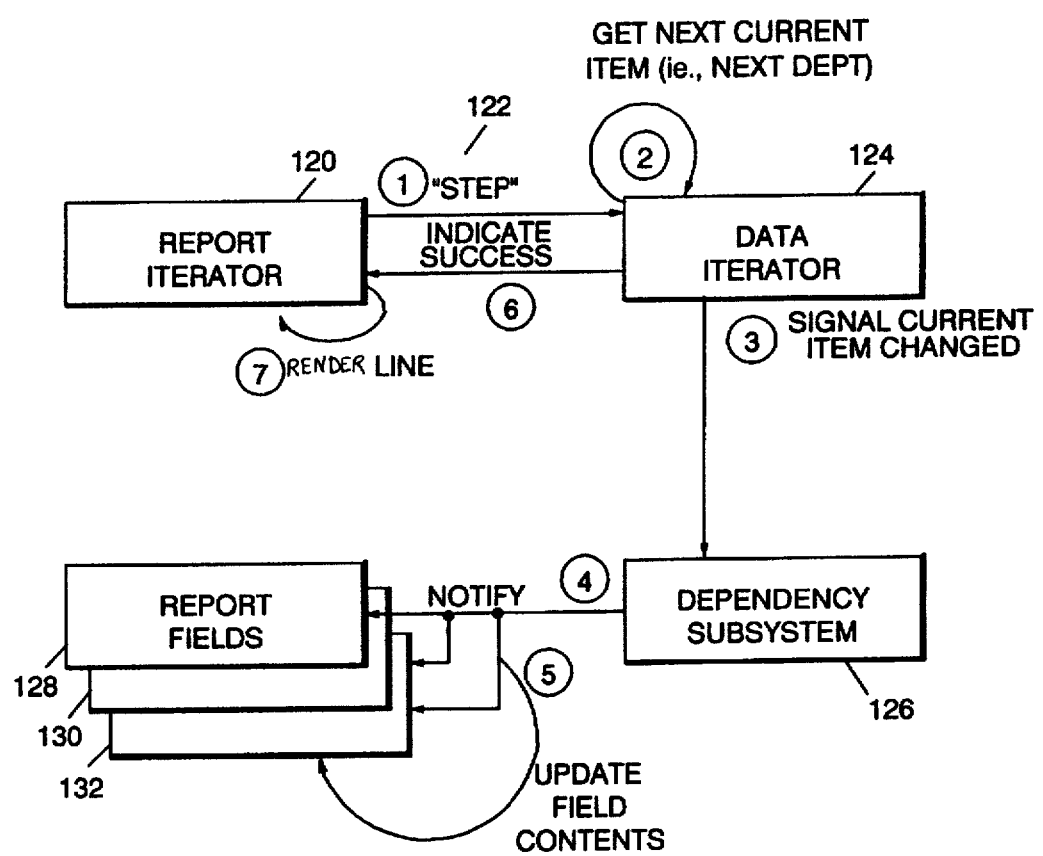
FIG. 5 graphically illustrates the creation of the report shown in FIG. 4.

Referring next to FIG. 5, a state diagram further illustrates the example shown in FIG. 4. In the first step of the present invention, the report iterator 120 communicates with the data iterator 124. The second step is then conducted by the data iterator 124 by getting the next current item (i.e., the next department object). The data iterator 124 then takes the third step by communicating with the dependency subsystem 126 by signalling the current item has changed. The dependency subsystem 126 then takes the fourth step by notifying the appropriate report fields as indicated by reference numerals 128, 130 and 132, which results in the fifth step of updating the field contents. The data iterator 124 then takes the sixth step by indicating success to the report iterator 120, which then takes the seventh step in the procedure by rendering a line of data.

Another simple example of the present invention (for use with IBM's VisualAge product) can be illustrated with the addressing of envelopes for a collection of person objects (not shown). Each person object has the following attributes: name, address and phone number. In the address report, report fields within a report iterator would be created to display each of these attributes. For each field, a dependency on the appropriate attribute of a person object would be defined. Each of these dependencies would be defined to send the dependent field the message information which will update the contents of the field. This is done by making connections between the appropriate attributes of a person object and the dependent report field. For example, the name of the person object would be connected to the first field in the address layout. When this report is run, the report field will register a dependency on the name attribute of the person object which means that as the current person object is updated, the contents of the field will also be updated.

One type of update which occurs is the update of the current object in a composite object which supports iteration. Any composite object, that is, an object which can contain zero or more other objects, can support iteration. Examples of classes which inherently support iteration are streams and database query result tables each of which has the concept of a current object, provides a way to set the current object to the next available object, and can indicate when there are no more objects. Collections support iteration indirectly by the fact that a stream can easily be created to provide iteration for a collection.

By utilizing the present invention in an object oriented reporting environment, new possibilities in reporting are enabled by the ability to report on any type of object which can be created. The event dependency mechanism of object oriented languages, such as Smalltalk, allows a much more flexible and openended reporting environment than is possible with a traditional report engine. Examples of unique capabilities provided by the present invention are: arbitrary mixing of different types of groups of objects within a report, arbitrary levels of nesting of report groups, mixing of different fields reporting on different types of objects within a line of a report, and the ability to dynamically compute the contents of a field using any available objects in the system.

Although the present invention has been described with respect to a specific preferred embodiment thereof, various changes and modifications may be suggested by one skilled in the art, and it is intended that the present invention encompass such changes and modifications as fall within the scope of the appended claims.

We claim:

1. A method of generating a report in an object-oriented software environment, comprising the steps of:

laying out a report iterator including a report group header, a report group body having at least one report field, and a report group footer;

enabling communication between said report iterator and a data iterator;

creating a dependency between contents of said at least one report field and an attribute of a current object;

stepping sequentially through a plurality of objects including said current object as a result of said communication;

signalling a dependency system that said current object of said plurality of objects has changed; and sending a new value each time said current object has changed to a report field of said report group body.

2. The method of claim 1, wherein said step of creating a dependency comprises:

instructing an object to respond when a predetermined attribute thereof changes.

3. The method of claim 1, wherein said step of creating a dependency comprises the steps of:

Selecting a source object;

selecting a source object attribute;

selecting a target object;

selecting a target object attribute; and connecting said source object attribute and said target object attribute with a line to visually indicate a connection therebetween.

4. The method of claim 3, wherein said step of enabling communication comprises:

connecting an iterator attribute of said report iterator to a self attribute of said data iterator.

5. A system for generating a report in an object-oriented software environment, comprising:

means for laying out a report iterator including a report group header, a report group body having at least one report field, and a report group footer;

means for enabling communication between said report iterator and a data iterator;

means for creating a dependency between contents of said at least one report field and an attribute of a current object;

means for stepping sequentially through a plurality of objects including said current object as a result of said communication;

means for signalling a dependency system that said current object of said plurality of objects has changed; and means for sending a new value each time said current object has changed to a report field of said report group body.

6. The system of claim 5, wherein said means for creating a dependency comprises:

means for instructing an object to respond when a predetermined attribute thereof changes.

7. The system of claim 5, wherein said means for creating a dependency comprises:

means for selecting a source object;

means for selecting a source object attribute;

means for selecting a target object;

means for selecting a target object attribute; and means for connecting said source object attribute and said target object attribute with a line to visually indicate a connection therebetween.

8. The system of claim 7, wherein said means for enabling communication comprises:

means for connecting an iterator attribute of said report iterator to a self attribute of said data iterator.

9. A computer program product for generating a report in an object-oriented software environment, comprising:

a computer usable medium having computer readable program code means embodied in said medium for laying out a report iterator including a report group header, a report group body having at least one report field, and a report group footer;

computer readable program code means for enabling communication between said report iterator and a data iterator;

computer readable code means for creating a dependency between contents of said at least one report field and an attribute of a current object;

computer readable code means for stepping sequentially through a plurality of objects including said current object as a result of said communication;

computer readable code means for signalling a dependency system that said current object of said plurality of objects has changed; and computer readable code means for sending a new value each time said current object has changed to a report field of said report group body.

10. The computer program product for generating a report in an object-oriented software environment of claim 9, wherein said computer readable code means for creating a dependency comprises:

computer readable code means for instructing an object to respond when a predetermined attribute thereof changes.

11. The computer program product for generating a report in an object-oriented software environment of claim 9, wherein said computer readable code means for creating a dependency comprises:

computer readable code means for selecting a source object;

computer readable code means for selecting a source object attribute;

computer readable code means for selecting a target object;

computer readable code means for selecting a target object attribute; and computer readable code means for connecting said source object attribute and said target object attribute with a line to visually indicate a connection therebetween.

12. The computer program product for generating a report in an object-oriented software environment of claim 11, wherein said computer readable code means for enabling communication comprises:

computer readable code means for connecting an iterator attribute of said report iterator to a self attribute of said data iterator.

13. The computer program product for generating a report in an object-oriented software environment of claim 12, further comprising:

computer readable code means for implementing an abtStepMessage protocol and an abtResetMessage protocol.

* * * * *